United States Patent [19]

Lee et al.

[11] Patent Number: 5,822,360
[45] Date of Patent: Oct. 13, 1998

[54] METHOD AND APPARATUS FOR TRANSPORTING AUXILIARY DATA IN AUDIO SIGNALS

[75] Inventors: Chong U. Lee, San Diego; Kamran Moallemi, Del Mar; Robert L. Warren, Cardiff, all of Calif.

[73] Assignee: Solana Technology Development Corporation, San Diego, Calif.

[21] Appl. No.: 524,132

[22] Filed: Sep. 6, 1995

[51] Int. Cl.⁶ .............................. H04B 1/707; H04B 1/69
[52] U.S. Cl. ..................... 375/200; 375/206; 370/493; 370/495; 370/497; 370/527; 370/529; 704/219; 704/201
[58] Field of Search ..................... 375/200, 240, 375/354, 364, 241, 242; 370/493, 494, 495, 497, 527, 529; 395/2.28; 704/200, 201, 203, 214, 219, 262, 269

[56] References Cited

U.S. PATENT DOCUMENTS

| | | |
|---|---|---|
| 3,845,391 | 10/1974 | Crosby . |
| 4,079,419 | 3/1978 | Siegle et al. . |
| 4,313,197 | 1/1982 | Maxemchuk . |
| 4,425,661 | 1/1984 | Moses et al. . |
| 4,534,054 | 8/1985 | Maisel . |
| 4,962,535 | 10/1990 | Kimura et al. ............................. 381/43 |
| 5,113,437 | 5/1992 | Best et al. . |
| 5,138,661 | 8/1992 | Zinser ........................................ 381/35 |
| 5,319,735 | 6/1994 | Preuss et al. ........................... 395/2.14 |
| 5,379,345 | 1/1995 | Greenberg . |
| 5,404,377 | 4/1995 | Moses . |
| 5,450,490 | 9/1995 | Jensen et al. . |

Primary Examiner—Don N. Vo
Attorney, Agent, or Firm—Barry R. Lipsitz; Ralph F. Hoppin

[57] ABSTRACT

Auxiliary data is transported in a conventional audio signal by hiding the data in the form of colored noise. The colored noise has a spectrum that simulates the spectrum of the primary audio signal. The data to be transported is first converted to a spread spectrum signal. The primary audio signal is analyzed to determine its spectral shape. The same spectral shape is imparted to the spread spectrum signal, which is then combined with the primary audio signal for transmission. The spectral shaping can be performed using time domain modeling and synthesis such as linear predictive coding or by using subband coding techniques such as fast Fourier transforms. A plurality of different auxiliary information streams can be transported on the audio signal. By adjusting the gain of individual spread spectrum signal carrier(s) and the power of the colored noise, the auxiliary information stream(s) can be rendered inaudible in the primary audio signal, or at any desired level below or above an audible threshold.

64 Claims, 12 Drawing Sheets

METHOD AND APPARATUS FOR TRANSPORTING AUXILIARY DATA IN AUDIO SIGNALS

BACKGROUND OF THE INVENTION

The present invention relates to a method and apparatus for hiding data in an audio signal, and more particularly to a scheme for inserting one or more auxiliary data signals into a primary audio signal being communicated over existing audio channels. Methods and apparatus for recovering the hidden data from the audio signal are also disclosed.

The capacity of a transmission channel to carry information is limited by the bandwidth of the channel. Since the bandwidth of wireless communication channels is limited by the realities of the electromagnetic spectrum, it has become necessary to develop techniques for increasing the amount of information that can be carried within a channel of a given bandwidth. For example, techniques for compressing digital data to squeeze more data within a given bandwidth or data storage space are well known.

Another approach to communicating additional data within a given bandwidth is to identify areas where supplemental information can be transported with a primary signal, without adversely affecting the transport of the primary signal itself. Such techniques can be used in combination with known compression methods. One such technique is the transport of data together with an audio signal. In such a technique, the bandwidth of the audio channel remains as is, and additional information is packed with the audio information such that it can be retrieved without substantially degrading the quality of the primary audio signal.

Due to the method of representing sound in audio systems, there is an inherent redundancy in a conventional audio signal. Instantaneous sound pressure is recorded by an amplitude value or voltage as an audio signal, presenting a mismatch between the actual representation and human auditory perception. Even though the human ear is somewhat nonlinear in many respects, it behaves like a bank of bandpass filters or a spectrum analyzer. At each frequency, the perception is approximately logarithmic such that the amount of noise that can be tolerated is proportional to the signal. In other words, once the "signal to noise ratio" (SNR) exceeds a certain threshold, the noise is no longer audible. This SNR threshold is typically less than 40 dB and is maintained over most of the audible frequency range. Such a relatively low SNR requirement can allow an information bearing signal to pass the existing audio signal chain (e.g., from the audio signal source to the transducers reproducing the sound) undetected by a human ear, as long as the SNR is maintained at all frequencies.

One method for embedding digital information in an audio signal is disclosed in U.S. Pat. No. 5,319,735 entitled "Embedded Signalling." This patent discloses the generation of a code signal representing a sequence of code symbols to be embedded, the code signal having frequency components essentially confined to a preselected signalling band lying within and less than the bandwidth of the audio signal. The audio signal is continuously frequency analyzed over a frequency band encompassing the signalling band. The code signal is dynamically filtered as a function of the analysis to provide a modified code signal with frequency component levels which, at each time instant, are essentially negligibly small outside the signalling band. At each frequency within the signalling band, the frequency component levels of the modified code signal are essentially a preselected proportion of the levels of the audio signal frequency components in a corresponding frequency range. The modified code signal is combined with the audio signal to provide a composite audio signal. The frequency analysis and dynamic filtering is accomplished using a large bank of bandpass filters. Such structure leads to a rather complicated and expensive implementation that may have limited practical value.

It would be advantageous to provide a more robust scheme for hiding data in a conventional audio signal. Such a scheme should enable a plurality of different data streams to be carried with the audio signal, without substantially altering the quality of the audio signal. The different data streams should be able to be provided at different data rates and be able to be combined in any number of ways prior to being added to the audio signal. Different data streams or combinations thereof should also be able to be added to the audio signal in a "cascade" approach after other streams have already been added to the audio signal. The combined data streams should be able to be provided at different levels (i.e., with different gains) in the audio signal, and the power of the combined streams should be adjustable to maintain the combination at a desired level within the audio signal.

Further, the type of information carried by the audio signal should be virtually unlimited. For example, it would be advantageous to allow data that is completely unrelated to the audio signal to be carried. Similarly, it would be advantageous to enable data ancillary to the audio data to be carried, such as data for effecting a copy protection scheme precluding the audio signal from being copied without proper authorization or for otherwise controlling the use of the audio program or other information (e.g., video or multimedia) associated with the audio signal. Information identifying the content of the audio signal, such as the name and/or performers of an audio program, and polling information for market research or commercial verification might also be hidden using such a scheme. Further, the scheme used to hide data in the audio signal should be able to hide either a modulated carrier, an unmodulated carrier (e.g., pilot), or a combination of both.

The present invention relates to methods and apparatus for transporting and recovering information hidden in an audio signal having the aforementioned and other advantages.

SUMMARY OF THE PRESENT INVENTION

In accordance with the present invention, a method is provided for hiding auxiliary information in an audio signal for communication to a receiver. A pseudorandom noise carrier (having a flat spectrum) is modulated by the auxiliary information to provide a spread spectrum signal carrying the information. The audio signal is evaluated to determine its spectral shape. A carrier portion of the spread spectrum signal is spectrally shaped (i.e., "colored") to simulate the spectral shape of the audio signal. The spread spectrum signal having the spectrally shaped carrier portion is combined with the audio signal to produce an output signal carrying the auxiliary information as random noise in the audio signal.

In an illustrated embodiment, the output signal comprises the sum of the spread spectrum signal and the audio signal. The auxiliary information can be coded using a forward error correction (FEC) code prior to the modulating step. In this manner, the auxiliary information modulates the carrier in the form of FEC data.

A method is provided for recovering the auxiliary information from the output signal, in which the spectral shape of the output signal is determined. The output signal is then processed, based on the determined spectral shape, to flatten (i.e., "whiten") the carrier portion of the spread spectrum signal contained in the output signal. The spread spectrum signal is demodulated after the carrier portion has been whitened. The demodulation despreads the spread spectrum signal to recover the FEC data. The FEC data is then decoded to recover the auxiliary information. In an embodiment where the auxiliary information is not FEC coded, the auxiliary information is directly recovered from the despread spread spectrum signal.

The step of evaluating the audio signal to determine its spectral shape can use time domain modeling, such as linear predictive coding (LPC) techniques, to determine the spectral shape of the audio signal. LPC is particularly advantageous because it provides a prediction gain that can be used, for example, to reduce the power of the audio signal. In such an embodiment, LPC coefficients are provided for use in spectrally shaping the carrier of the spread spectrum signal. In order to determine the spectral shape of the output signal for use in recovering the auxiliary information at a decoder, counterpart LPC coefficients can be independently derived from the spectral shape of the output signal. The counterpart LPC coefficients are provided for use in processing the output signal to whiten the carrier portion.

The power of the spread spectrum signal can be adjusted prior to combining it with the audio signal. The adjustment can be used, for example, to render the spread spectrum signal below an audible threshold (i.e., make it substantially inaudible) in the audio signal. The adjustment can also be used to render the spread spectrum signal audible in an additive fashion, such that the quality of successive copies of an audio signal recorded, e.g., on a digital audio tape will degrade more with each new copy.

It is also possible to hide a plurality of auxiliary information signals on the audio signal. In order to accomplish this, a plurality of pseudorandom noise carriers is modulated by auxiliary information signals to provide a plurality of spread spectrum signals. The carriers are spectrally shaped to simulate the spectral shape of the audio signal. The spectrally shaped carriers are combined with the audio signal to produce the output signal. In one embodiment, each of the carriers is individually spectrally shaped prior to its combination with the audio signal. In another embodiment, the carriers are combined before they are spectrally shaped, and the combined carriers are spectrally shaped as a group prior to their combination with the audio signal. In a hybrid embodiment, some of the carriers can be individually spectrally shaped prior to their combination with the audio signal, with other carriers being combined as a group before being spectrally shaped and combined with the audio signal.

In order to recover the auxiliary information from an output signal in which a plurality of auxiliary information signals is hidden, the spectral shape of the output signal is determined. The output signal is processed, based on its spectral shape, to whiten the carrier portions of the spread spectrum signals contained therein. A desired spread spectrum signal is demodulated after the carrier portion has been whitened. The spread spectrum signal is despread during demodulation to recover the auxiliary information carried thereby.

The pseudorandom noise carrier can be generated cryptographically to provide secure communication of the auxiliary information to a receiver. In such an embodiment, a secure cryptographic key can be provided at both the transmitter and receiver. The key is used to generate the pseudorandom noise carrier in accordance with a well known cryptographic algorithm, such as the data encryption standard (DES). Without having the same key at both the transmitter and receiver, it will not be possible to produce the same pseudorandom noise carrier at the transmitter and receiver. Thus, without the proper key, the particular pseudorandom noise carrier necessary to recover the auxiliary information at the receiver cannot be derived. This fact precludes the recovery of the auxiliary information by parties that are not authorized with the proper key. Other known encryption algorithms, including public and private key schemes, can be used to encrypt the pseudorandom noise carrier.

Apparatus is provided for hiding auxiliary information in an audio signal for communication to a receiver. The apparatus includes means for converting a data stream of the auxiliary information into a spread spectrum signal carrying the information. Means are provided for evaluating the audio signal to determine its spectral shape. Means responsive to the evaluating means spectrally shape a carrier portion of the spread spectrum signal to simulate the spectral shape of the audio signal. The spread spectrum signal having the spectrally shaped carrier portion is combined with the audio signal to produce an output signal carrying the auxiliary information as substantially random noise in the audio signal. Optionally, means can be provided for adjusting the power of the spread spectrum signal prior to the combining means, to render the spread spectrum signal at a desired level (e.g., below an audible threshold) in the audio signal. Also optionally, means can be provided for coding the auxiliary information using a forward error correction code before converting the auxiliary information into the spread spectrum signal.

In one illustrated embodiment, the evaluating means comprise a linear predictive coding (LPC) processor coupled to receive the audio signal and generate LPC coefficients therefrom. The means for spectrally shaping the carrier portion comprise an LPC filter responsive to the LPC coefficients.

In an alternate embodiment for carrying multiple streams of auxiliary information in an audio signal, the evaluating means comprise a subband analyzer coupled to receive and estimate the spectrum of the audio signal. The means for spectrally shaping the carrier portion comprise a subband filter responsive to the subband analyzer for processing the carrier portion. In an illustrated embodiment, the subband analyzer comprises a first fast Fourier transform (FFT) processor. The subband filter comprises a second FFT processor for processing the carrier portion, as well as weighting means for frequency weighting FFT outputs from the first and second FFT processors, and a third inverse FFT processor for processing an output of the weighting means to provide the spectrally shaped carrier portion.

Apparatus is provided for recovering the auxiliary information from the output signal that contains the combined audio signal and spread spectrum signal. This apparatus includes means for determining the spectral shape of the output signal. Means are provided for processing the output signal, based on the spectral shape determined by the determining means, to whiten the carrier portion of the spread spectrum signal contained in the output signal. Means are provided for demodulating the spread spectrum signal after the carrier portion has been whitened to obtain and despread the spread spectrum signal and recover the data stream.

In an embodiment where the spectral shaping is performed using linear predictive coding at the encoder, the decoder can comprise an LPC processor coupled to receive the output signal and generate LPC coefficients therefrom. Advantageously, the LPC coefficients will be derived at the decoder independently of the encoder, so that there is no need to communicate the coefficients from the encoder to the decoder. In order to whiten the carrier portion of the spread spectrum signal, the decoder can comprise an LPC filter responsive to the locally derived LPC coefficients. The use of such an LPC filter provides the advantageous prediction gain previously mentioned.

Where the encoder codes the auxiliary information using an FEC code, the decoder will include an FEC decoder. The FEC decoder decodes the data stream recovered by the demodulating means in order to provide the auxiliary information.

In an embodiment where the encoder uses a subband analyzer and subband filter to provide the spectral shaping, the decoder will include corresponding elements. In particular, a subband analyzer will be coupled to receive and estimate the spectrum of the output signal. A subband filter will be provided to process the output signal to whiten the carrier portion in response to the spectrum estimated by the subband analyzer. In a more specific embodiment, the subband analyzer used at the decoder can comprise an FFT processor. The subband filter at the decoder can comprise an FFT processor having an output multiplied to form a product with the output of the subband analyzer, together with an inverse FFT processor that receives the product of the other FFT processor outputs.

A decoder is provided for recovering auxiliary information carried by a spread spectrum signal that is hidden as colored noise in an audio signal. The spread spectrum signal includes a carrier having a spectral shape that simulates the spectral shape of audio information contained in the audio signal. Means are provided for determining the spectral shape of the audio information. The audio signal is processed based on the spectral shape determined by the determining means, to whiten the carrier. Means are provided for demodulating the whitened carrier to recover the spread spectrum signal. The recovered spread spectrum signal is despread, and then demodulated to recover the auxiliary information. The whitening of the carrier can be accomplished using linear predictive coding (LPC) techniques.

The decoder can be designed to recover a desired one of a plurality of auxiliary information signals carried on respective carriers of the spread spectrum signal. All of the carriers will be spectrally shaped to simulate the spectral shape of the audio information. The demodulator means at the decoder will include means for selecting a desired one of the carriers for demodulation to enable the recovery of a corresponding one of the auxiliary information signals. For each information signal, a separate demodulator (and FEC decoder, if necessary) is provided. The components for removing the spectral shaping (i.e., the "whitening circuitry") can be shared by all of the auxiliary information signals at the decoder.

The invention also provides a decoder that is implemented using a rake receiver. Such a decoder is particularly useful for decoding signals received from a basic white noise spread spectrum encoder, i.e., an encoder that provides auxiliary information in an audio signal as white (uncolored) noise. Whitening means in the decoder create intersymbol interference in the spread spectrum signal. A rake receiver receives the audio signal from the whitening means. The rake receiver demodulates the received audio signal to recover the spread spectrum signal with reduced intersymbol interference. The recovered spread spectrum signal is despread to recover the auxiliary information.

The whitening means in the rake receiver embodiment can comprise an LPC processor coupled to receive the audio signal and generate LPC coefficients therefrom. An LPC filter of order N is provided for receiving the audio signal. The LPC filter is responsive to the LPC coefficients for whitening the spectrum of the audio signal. The rake receiver comprises N taps or "fingers", where N is approximately equal to the order of the LPC filter. Each finger processes a different multipath of the spread spectrum signal when demodulating the received audio signal, thereby recovering the spread spectrum signal with reduced intersymbol interference in order to obtain the auxiliary information therefrom. In this embodiment, the rake receiver can further comprise means responsive to the LPC coefficients for dynamically changing the weights of the rake receiver taps.

DETAILED DESCRIPTION OF THE INVENTION

Figure 1:
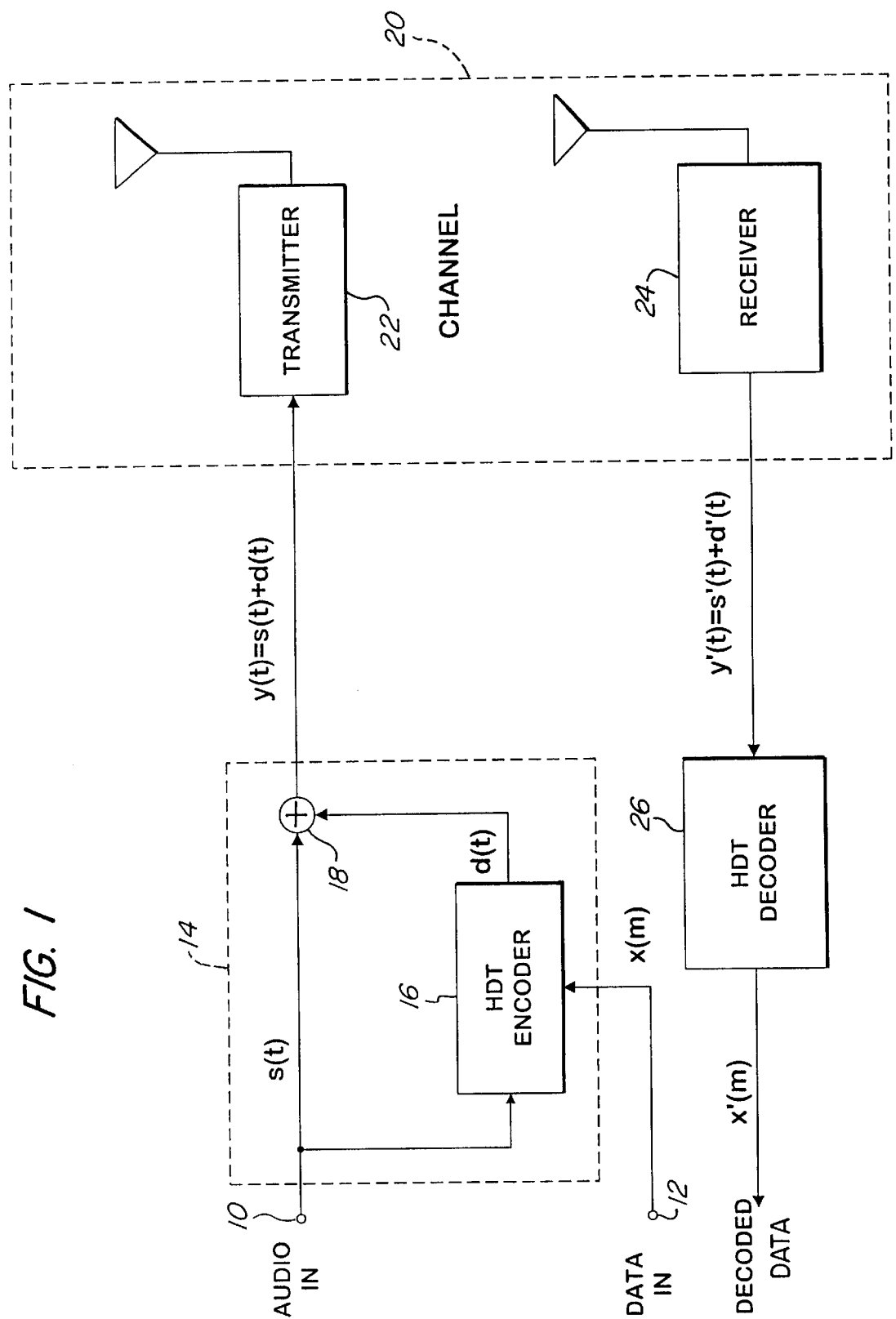
FIG. 1 is a high-level block diagram of the hidden data transport system of the present invention.

The present invention exploits the limits of human auditory perception to create a hidden channel within a physical channel designed to carry an audio signal. The subsequent modulation of the audio signal for transmission is relatively irrelevant. Well known AM, FM, and multilevel modulation techniques such as binary phase-shift keying (BPSK), quadrature phase-shift keying (QPSK), quadrature amplitude modulation (QAM), and other known modulation techniques can be used to transmit the audio signal after it has been processed in accordance with the present invention to carry hidden auxiliary information. The auxiliary information can comprise any desired data which may or may not have a relationship with the audio data. For example, text data, control data, and other unrelated data can be carried in an audio signal. In addition, or alternatively, data identifying the audio signal and/or its content, market research and commercial verification data, as well as copy protection data can be carried using the techniques of the present invention. Thus, it should be appreciated that the present invention is not limited in any way as to the type of data that can be hidden (e.g., inaudibly carried) in the audio signal.

The best kind of signal to use as the carrier for the auxiliary information to be hidden is a random noise-like signal. Random noise is easier to tolerate perceptually than other correlated noise.

Pseudorandom noise is typically used in a spread spectrum communication system. Such a system is used in accordance with the present invention in order to reliably transmit data at a desired carrier to noise ratio (CNR) of, for example, −20 dB. A high processing gain, i.e., ratio between signaling rate and signal bandwidth, is needed to overcome a low CNR. Therefore, in a typical spread spectrum system the information rate is very low, typically below 100 bits per second over a 20 KHz bandwidth audio channel. A pseudorandom (PN) carrier used in a spread spectrum system has a flat (white) spectrum. Thus, the required SNR is difficult to maintain at the spectral valleys unless the processing gain is much higher. In order to overcome this problem, the present invention adaptively shapes the PN spectrum to match that of the audio spectrum. This technique enables auxiliary information to be hidden in an audio signal at reasonably high data rates.

Adaptive shaping of the PN spectrum in accordance with the present invention to generate a "colored noise" carrier signal can be achieved, for example, by passing white PN noise through a linear predictive coding (LPC) filter that is derived from the audio signal in which data is to be hidden. The PN noise sequence serves as the carrier signal that is shaped by an LPC filter to match the spectrum of the audio signal. Advantageously, the nearly perfect inverse LPC filter can be computed at a receiver since the injected noise signal itself will have a similar spectral shape as the audio signal.

A benefit of employing an LPC filter is the flattening or "whitening" effect of the interfering signal, in this case the audio signal. The linear prediction process removes the predictable part of the signal such that the prediction residual has a relatively flat spectrum. This type of noise significantly improves the performance of forward error correction (FEC) coding that will typically be provided for the auxiliary information in order to reduce the probability of errors at the receiver.

Another benefit of an LPC embodiment is that transmission channel distortion can also be compensated for by the LPC filter through the whitening process. In effect, the inverse LPC filter at the receiver acts as an automatic equalizer for the combined filter formed by the transmit LPC filter and the channel filter. A further benefit of LPC is that it provides a prediction gain useful, for example, in reducing the power of the audio signal.

Alternate embodiments are disclosed in which subband coding is used instead of the time domain modelling and synthesis provided by LPC. In order to implement the invention using subband coding, fast Fourier transform (FFT) techniques can be used.

FIG. 1 illustrates the hidden data transport (HDT) system of the present invention in simplified form. A primary audio signal is input via terminal 10 to an encoder 14 that includes an HDT encoder 16 and a summing circuit 18. The HDT encoder 16 receives via terminal 12 auxiliary data that is to be hidden in the audio signal.

The primary audio signal s(t) is analyzed by the HDT encoder 16 to determine the spectral shaping requirement. The auxiliary data x(m) input via terminal 12 is modulated to produce a colored noise signal d(t) which is then added to the primary audio signal s(t) in summer 18 before transmission. The signal power of d(t) is adjusted to be a small fraction of the power in s(t). The combined signal y(t)=s(t)+d(t) is transmitted via a transmitter 22 over a channel generally designated 20. Although a wireless channel is illustrated in FIG. 1, it should be appreciated that a wired channel (e.g., electrically conductive cable or fiber optic cable) can also be used. The invention is also applicable to audio signals recorded on magnetic or optical media or the like, such as tapes and compact discs as well known in the audio reproduction art.

A receiver 24 produces a replica of the transmitted signal, denoted y'(t)=s'(t)+d'(t). Since the primary audio signal s'(t) masks the auxiliary data, the auxiliary data d'(t) is hidden and inaudible. Users listening to the signal will hear the normal audio s'(t) and will not perceive the presence of d'(t). HDT decoder 26 will recover the auxiliary digital signal x(m) as x'(m) from the received signal y'(t).

Transmitter 22, receiver 24 and the propagation medium through which they communicate are collectively referred to as the channel 20. This channel can be virtually anything capable of carrying an audio signal, using any form of analog or digital transmission. Further, the transmission may be in a compressed or uncompressed format. Examples are AM or FM broadcasting, satellite transmission, cable television, cassette tape, compact disc, and the like.

Figure 2:
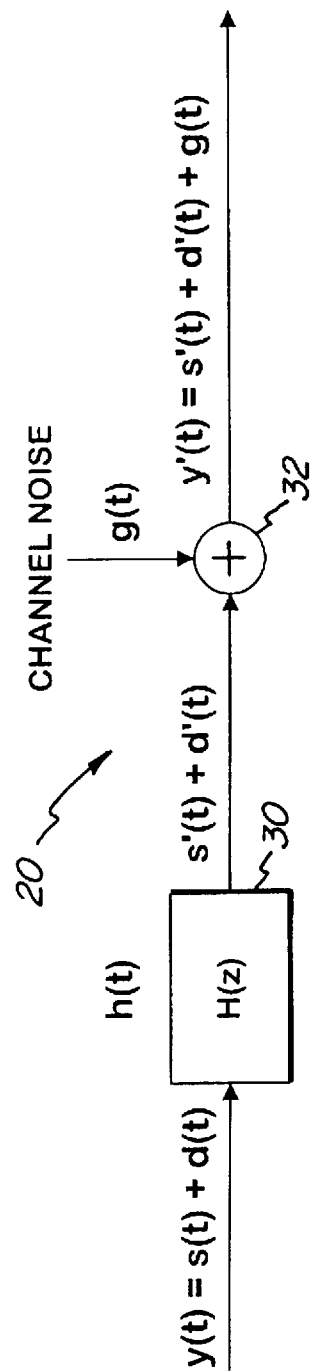
FIG. 2 is a block diagram illustrating a model of a typical transmission channel.

FIG. 2 is a model of the transmission channel 20. The channel is simply modeled by a linear channel filter 30 (H(z)), with an additive noise g(t) referred to as "channel noise." In the illustrative embodiment of FIG. 2, the channel noise is added to the output of the linear channel filter 30 via an adder 32.

The linear channel filter H(z) is expected to have a nominal low pass characteristic with wide enough bandwidth to pass good quality audio. The output of the transmission channel is y'(t)=s'(t)+d'(t)+g'(t). The components s'(t) and d'(t) are the responses of the channel to the input s(t) and d(t), respectively.

Figure 3:
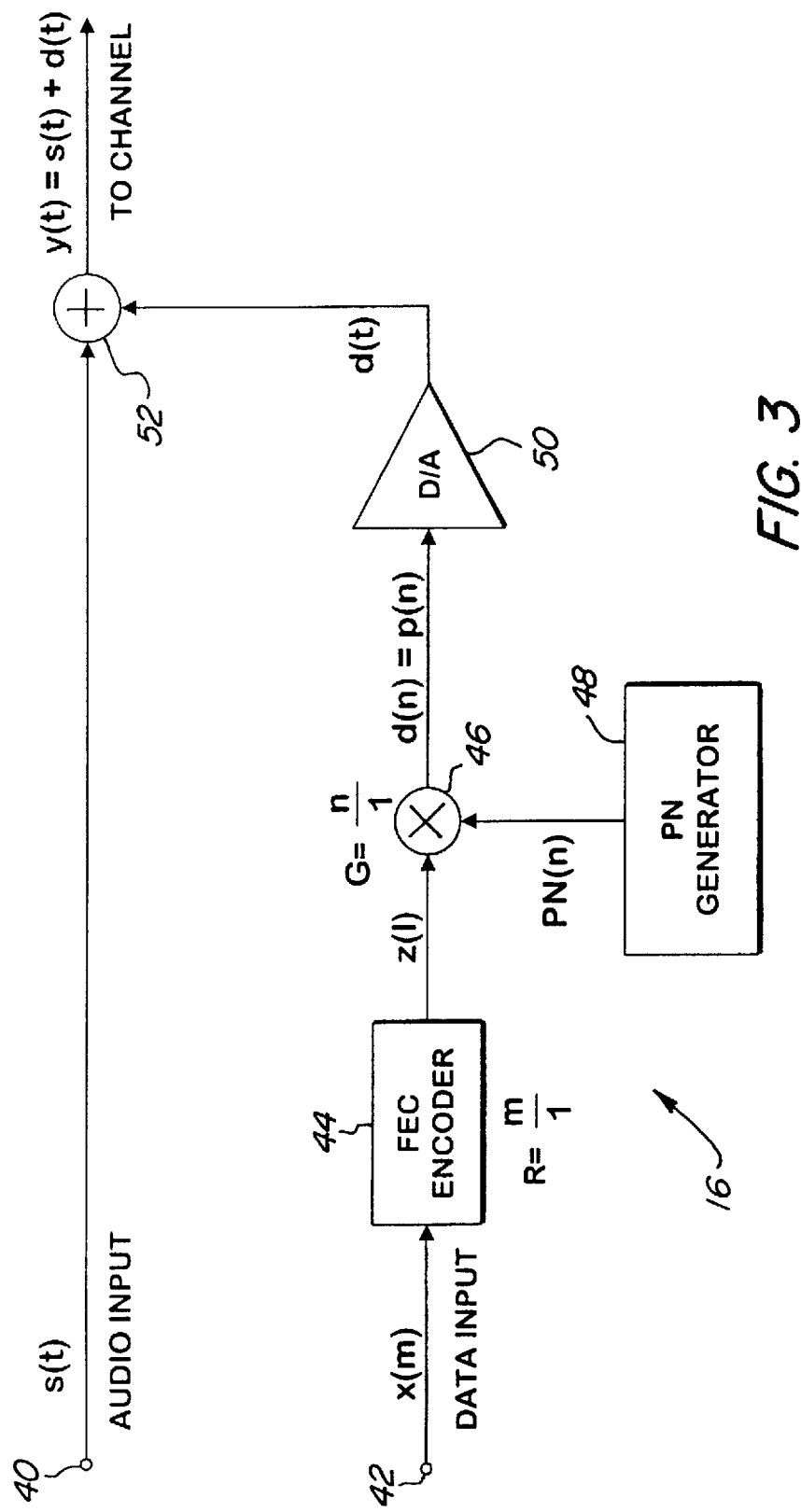
FIG. 3 is a block diagram of a basic white noise hidden data transport encoder.

FIG. 3 illustrates a basic white noise HDT encoder that allows auxiliary information to be carried on an audio signal as uncolored noise (i.e., without spectral shaping of the spread spectrum carrier). The use of uncolored noise to carry the auxiliary information provides a lower performance than can be obtained using colored noise, as described in more detail below in connection with FIGS. 5 and 6. However, a basic encoder as illustrated in FIG. 3 enables a simple and straightforward implementation.

The encoder 16 of FIG. 3 receives the audio input s(t) via terminal 40. This input is added to the auxiliary information, which is in the form of a spread spectrum signal, via a summing circuit 52. It should be appreciated that the audio input can be combined with the spread spectrum signal carrying the auxiliary information using any known signal combining circuit.

The auxiliary information to be transported with the audio signal is input via terminal 42 to a forward error correcting (FEC) encoder 44. Such FEC encoders are well known in the art. The FEC encoded data is then multiplied with a pseudorandom noise sequence output from a conventional pseudorandom sequence generator 48 via a multiplier 46. The PN generator 48 can be based, for example, on a feedback shift register circuit or other well known key and generator circuit. The output of the generator PN(n) may, for example, take on values of either +1 or −1. The long-term power spectrum of PN(n) is flat (i.e., "white").

The output of multiplier 46 is a modulated PN sequence p(n). Normally, the sampling rate or "chip rate" of PN(n) is much higher than the symbol rate of the output z(l) of FEC encoder 44. Thus, G>>1, where G=n/l is the processing gain ("spreading ratio"). The signal processing from x(m) to p(n) illustrated in FIG. 3 comprises conventional direct sequence spread spectrum modulation.

The modulated PN sequence p(n) is input to a digital to analog converter 50, that converts the signal to its analog form d(t) for combination with the audio signal. The audio signal is then communicated over a channel to the encoder of FIG. 4.

Figure 4:
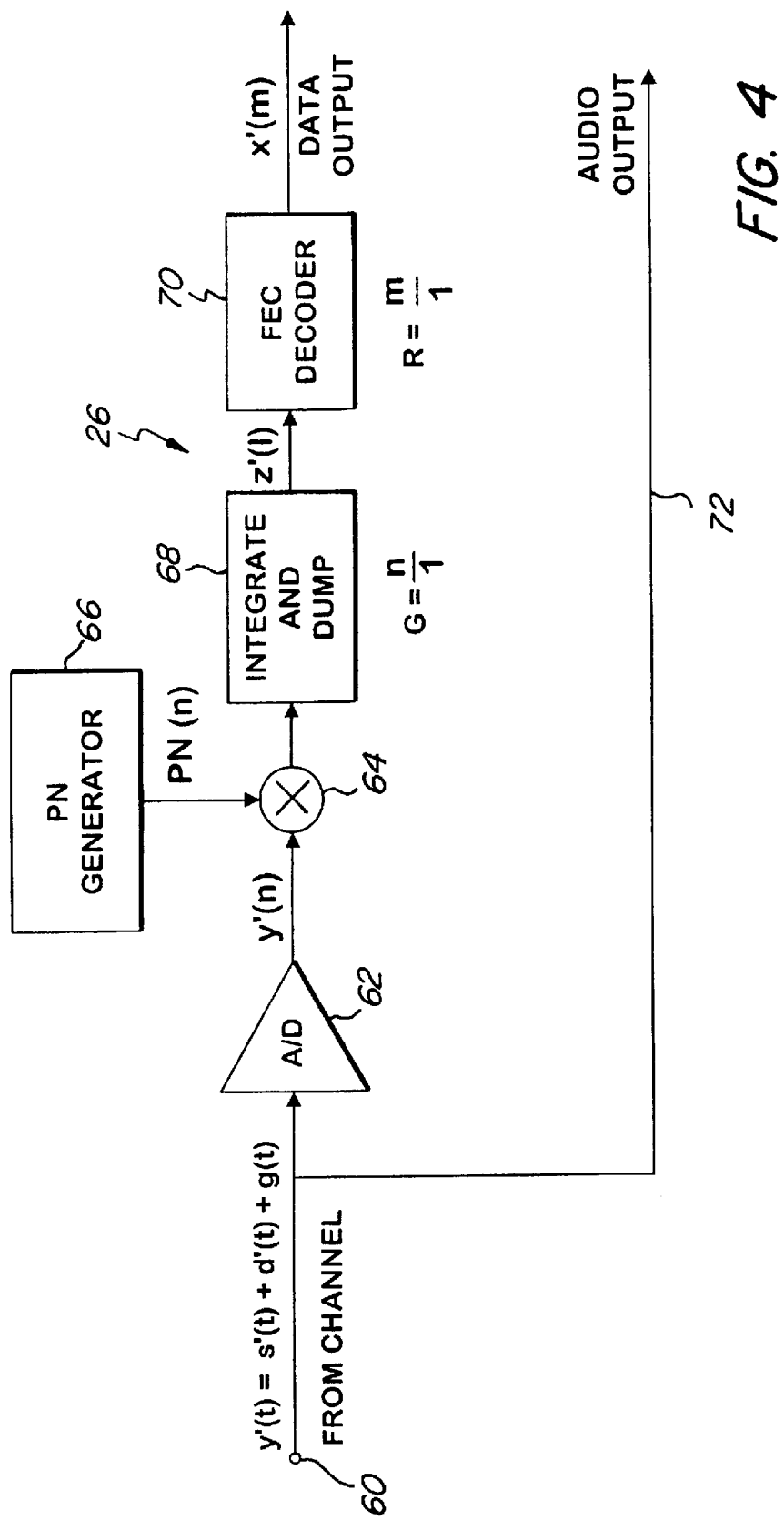
FIG. 4 is a block diagram of a basic white noise hidden data transport decoder.

At the decoder illustrated in FIG. 4, the audio signal carrying the auxiliary information is input via a terminal 60 to an analog to digital converter 62. The audio signal is also directly output via line 72 to conventional audio processing circuitry which will typically include an amplifier and speakers (or other transducer) for reproduction of the sound. The noise containing the auxiliary information is at a level in the audio output signal which is low enough to be substantially inaudible to a human being. Thus, the auxiliary information is "hidden" in the audio signal; it is there, but a listener will not hear it.

Analog to digital converter 62 converts the input signal to the digital domain for combination in multiplier 64 with the same pseudorandom sequence PN(n) used at the encoder. The pseudorandom sequence is provided by a PN sequence generator 66 which is identical to the PN sequence generator 48 found at the encoder. The multiplication performed by circuit 64 demodulates the spread spectrum signal, which is then despread in a conventional manner by integration and dumping circuit 68. The despread output z'(l) comprises the FEC encoded auxiliary information. This information is decoded by FEC decoder 70 to output the recovered auxiliary information x'(m).

Figure 5:
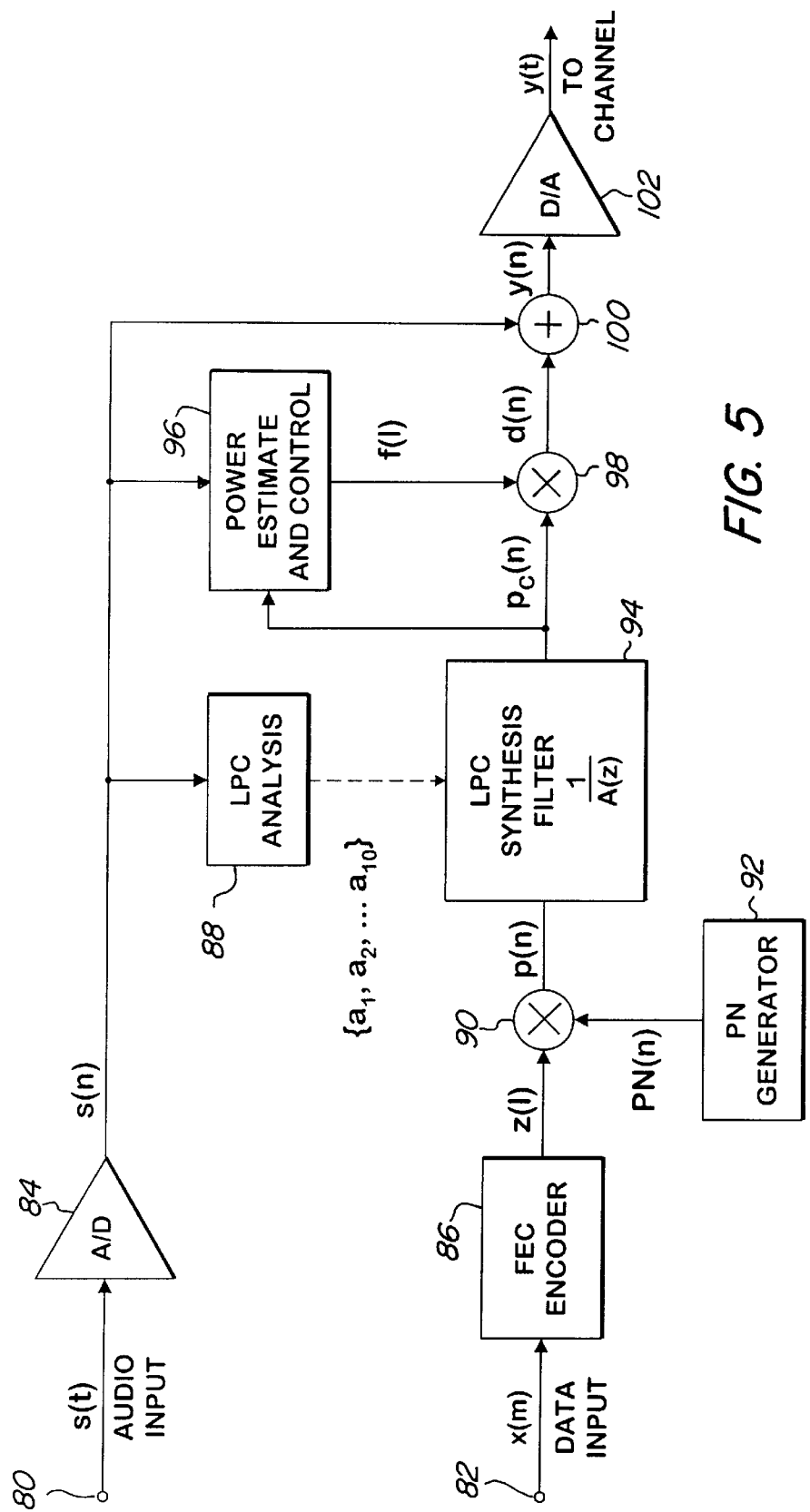
FIG. 5 is a block diagram of an LPC embodiment of a hidden data transport encoder providing spectral shaping and power adjustment of the auxiliary information to be hidden in the audio signal.
Figure 6:
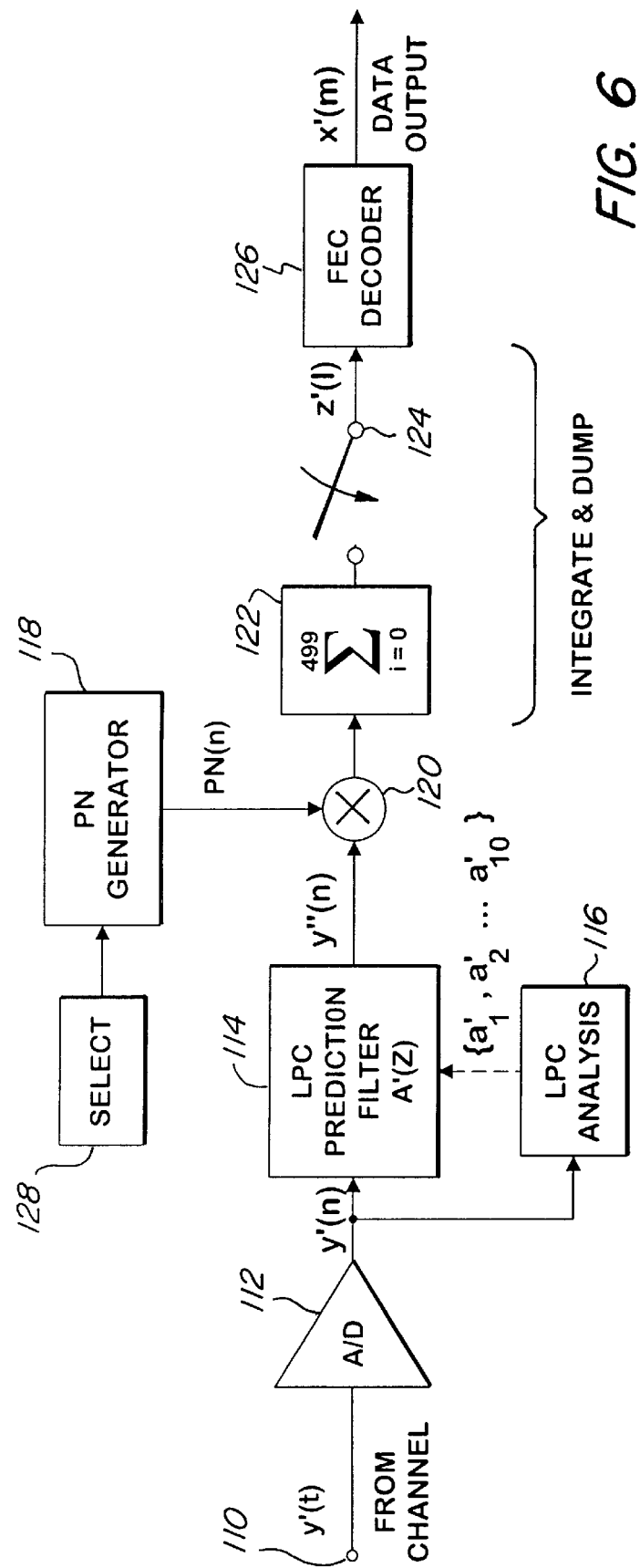
FIG. 6 is a block diagram of a decoder for recovering the hidden information output by the encoder of FIG. 5.

The amount of noise that can be inaudibly added to the primary audio signal can be increased by about ten to twenty dB by using a colored noise signal instead of the white noise signal provided by the encoder of FIG. 3. An example of a colored noise HDT encoder in accordance with the present invention is shown in FIG. 5. The implementation illustrated in the figure analyzes the audio information in the digital domain to determine its spectrum, colors the auxiliary data with the same spectrum, and combines the audio data with the colored auxiliary data digitally before the combined signal is converted back to the analog domain. It should be appreciated, however, that this implementation is merely an example of a preferred embodiment. The processing can be accomplished in either the digital or analog domain, and the signals can be transported as digital or analog signals depending on the particular requirements of the system using the invention. Thus, the provision of analog to digital and digital to analog converters in FIGS. 5 and 6 is not meant to suggest that the processing in accordance with the present invention must take place as shown.

The audio signal is input to the encoder of FIG. 5 via terminal 80. An A/D converter 84 converts the analog audio signal to a digital form s(n). The auxiliary data to be transported with the audio signal x(m) is input to an FEC encoder 86 via terminal 82. The FEC coding is used to ensure the integrity of the data, and generates coded symbol z(l). The ratio between the number of information bits and the number of symbols is R=m/l. The term m represents the sampling rate for x(m).

PN sequence generator 92 supplies the PN carrier PN(n) which, for example, can take on values of either +1 or −1. This provides a white long-term power spectrum. PN(n) is multiplied with z(l) in a multiplier 90 to generate the modulated PN sequence p(n).

The flat spectrum of the PN modulated signal p(n) undergoes spectral shaping in an LPC synthesis filter 94. The spectral shaping is applied by passing the PN modulated signal through filter 94 having the response 1/A(z), where $$A(z)=1-(a_1 z^{-1}+a_2 z^{-2}+\ldots+a_N z^{-N})$$

and the $a_j$'s are the coefficients of an Nth order LPC filter.

The coefficients of the LPC filter used for the spectral shaping conform to coefficients derived from the audio signal by an LPC analysis circuit 88. The LPC analysis can employ any of the known methods for analyzing a signal spectrum, such as Durbin's recursion discussed by L. Rabiner and R. Schafer, *Digital Processing of Speech Signals*, Prentice-Hall, 1978, Chapter 8.3.2, pp. 411–413.

The order N for the LPC analysis is made as large as necessary to accurately model the spectrum of the primary audio. For example, an order of between about 5 and 50 should be adequate for the LPC analysis. As will be appreciated by those skilled in the art, the order N may depend on the bandwidth of the signal. Thus, for example, for typical telephone bandwidths, N may be selected in a range of from about 5 to about 20. The LPC filter coefficients are updated as often as necessary to track the variations of the music or speech present in the primary audio.

The output of LPC synthesis filter 94 is a modulated colored noise sequence $p_c(n)$. The noise power is adjusted via a power estimating and control circuit 96 and multiplier 98 to a desired level. For example, where it is desired to have the auxiliary information be carried on the audio signal as inaudible noise, the noise power is adjusted to fall below the audible threshold. In other applications, it may be desired to set the noise power above the audible threshold. For example, in a copy protection scheme for digital audio tapes (DAT), it may be desired to add a noise signal to the digital audio each time a copy is made. After a given number of copies, the cumulative noise will be such that it will audibly degrade the quality of the recording. Alternatively, it may be desired to introduce a predetermined amount of interference to an audio signal. In this case, the power estimation and control circuitry 96 will be adjusted to introduce the desired amount of noise (which may be above the audible threshold) to the audio signal.

For each pseudorandom frame output from the filter 94, the average power in the primary audio signal s(n) and the average power in $p_c(n)$ are measured by the power estimate and control circuit 96. Proper scaling f(l) is applied to $p_c(n)$ via multiplier 98 to maintain the output signal power d(n) at the desired power level, such as below the hearing threshold. To render the auxiliary information inaudible, the ratio of the auxiliary information to the audio information is typically 1:100 in amplitude or 1:10,000 in power (40 dB). The power adjusted colored PN noise signal d(n) is added to the primary audio signal s(n) via adder 100 to produce a combined output signal y(n). The output signal y(n) can be converted to an analog signal y(t) via a digital to analog converter 102, for transmission in place of the primary audio signal s(t).

A hypothetical, but practical design example implementing the encoder of FIG. 5 can utilize an input data rate of 30 bits per second (m=30 Hz) for the auxiliary information input via terminal 82. The FEC encoder rate can be R=½ (l=60 Hz). The processing gain (spread ratio) for the example design is G=500 (27 dB). The pseudorandom sampling rate (chip frequency) is n=30 KHz. The LPC prediction order is N=10. It is assumed that the channel has at least 15 KHz of bandwidth with minor frequency distortions.

In the design example, the encoder uses binary phase shift keying (BPSK). In this example implementation, x(m), z(l), PN(n), and p(n) are binary signals, x(m)={0, 1}, z(l)={−1, +1}, PN(n)={−1, +1}, and p(n)={−1, +1}. The FEC encoder generates two samples of z(l) for every input sample of x(m). They may not be adjacent samples since an interleaver may be employed inside the FEC encoder. A PN frame is defined as a group of 500 PN chips (samples) of PN(n). For each sample of z(l), 500 chips of PN(n) in the PN frame are multiplied with z(l). In other words, merely the signs of 500 samples in the PN frame are changed if z(l)=−1. The resulting BPSK modulated PN signal p(n) has a white noise spectrum. The desired spectral shaping is obtained by passing p(n) through 1/A(z) to produce $p_c(n)$.

Although the primary audio (interfering signal) in the above design example is stronger than the noise signal (e.g., by 20 dB), the processing gain is very high. With R=½ and G=500, the effective processing gain is 1,000 (30 dB). The available bit energy over noise density (Eb/No) is 30–20=10 dB, which is very adequate for BPSK signaling.

It should be appreciated that the specific parameters noted in the above example are for purposes of illustration only. Other parameters may be used in a particular implementation, as will be appreciated by those skilled in the art.

FIG. 6 illustrates a decoder for the signals output from the encoder of FIG. 5. The decoder receives y'(t) via terminal 110. In order to undo the spectral shaping applied by the LPC synthesis filter 94 at the encoder and recover p(n), the decoder must have the LPC filter coefficients. These coefficients are not, however, transmitted by the encoder, even though the LPC order N is fixed and known to the decoder. Instead, the decoder performs its own LPC analysis on the received signal using LPC analyzer 116 to estimate the LPC filter. The coefficients derived from the estimate are input to an LPC prediction filter 114 that is the inverse of the LPC synthesis filter 94 at the encoder. Since s'(t) is the dominant component in the received signal, which is a good replica of s(t), and due to the averaging process embedded in the LPC analysis (providing a wide analysis window), the estimated LPC coefficients $a'_1, a'_2 \ldots a'_N$ can be very close to the LPC coefficients $a_1, a_2 \ldots, a_N$ used at the encoder.

Once the coefficients for the LPC prediction filter $A'(z) = [1-(a'_1z^{-1}+a'_2z^{-2}+ \ldots +a'_Nz^{-N})]$ are found, the sampled received signal, y'(n), is filtered to produce y"(n)=s"(n)+p'(n)+g'(n). p'(n) is a close replica of p(n) since the combined influence of the LPC synthesis filter 1/A(z) and the channel response H(z) is cancelled by the LPC prediction filter A'(z). Both s"(n) and g'(n) are the prediction residuals when s'(n) and g(n) are filtered by A'(z), respectively. The effect of g'(n) can be largely ignored due to a high processing gain. A'(z) removes much of the redundancy in s'(n) so that s"(n) will have a flat, white spectrum. The power in s"(n) is also lowered by a typically large prediction gain of the LPC filter A'(z). Consequently, s"(n)+g'(n) becomes a white noise interference to p'(n), which itself has a white noise spectrum.

The remaining steps for recovering the auxiliary data from p'(n) are similar to those used by the sequence spread spectrum demodulator of FIG. 4. The same PN sequence synchronized to the PN sequence used at the encoder is multiplied with y"(n) using PN generator 118 and multiplier 120. The integration and dump circuit comprising summer 122 and switch 124 despreads and recovers z'(l) and integrates out much of the power in s"(n)+g'(n). In the example embodiment illustrated, the correlation property of the PN sequence allows a constructive summation of all 500 chips in p(n) to produce z'(l). In this example, switch 124 is switched at a rate of 60 Hz, and z'(l) has an SNR of about 14 dB (5:1), which is high enough for a simple FEC decoder with R=½ to reliably decode x'(m) at 30 bps. The signal to noise ratio (signal being z'(l)) is improved by the processing gain G=n/l. Finally, the FEC decoder 126 performs the error correction necessary to produce a reliable estimate of the auxiliary data x'(m).

Figure 7:
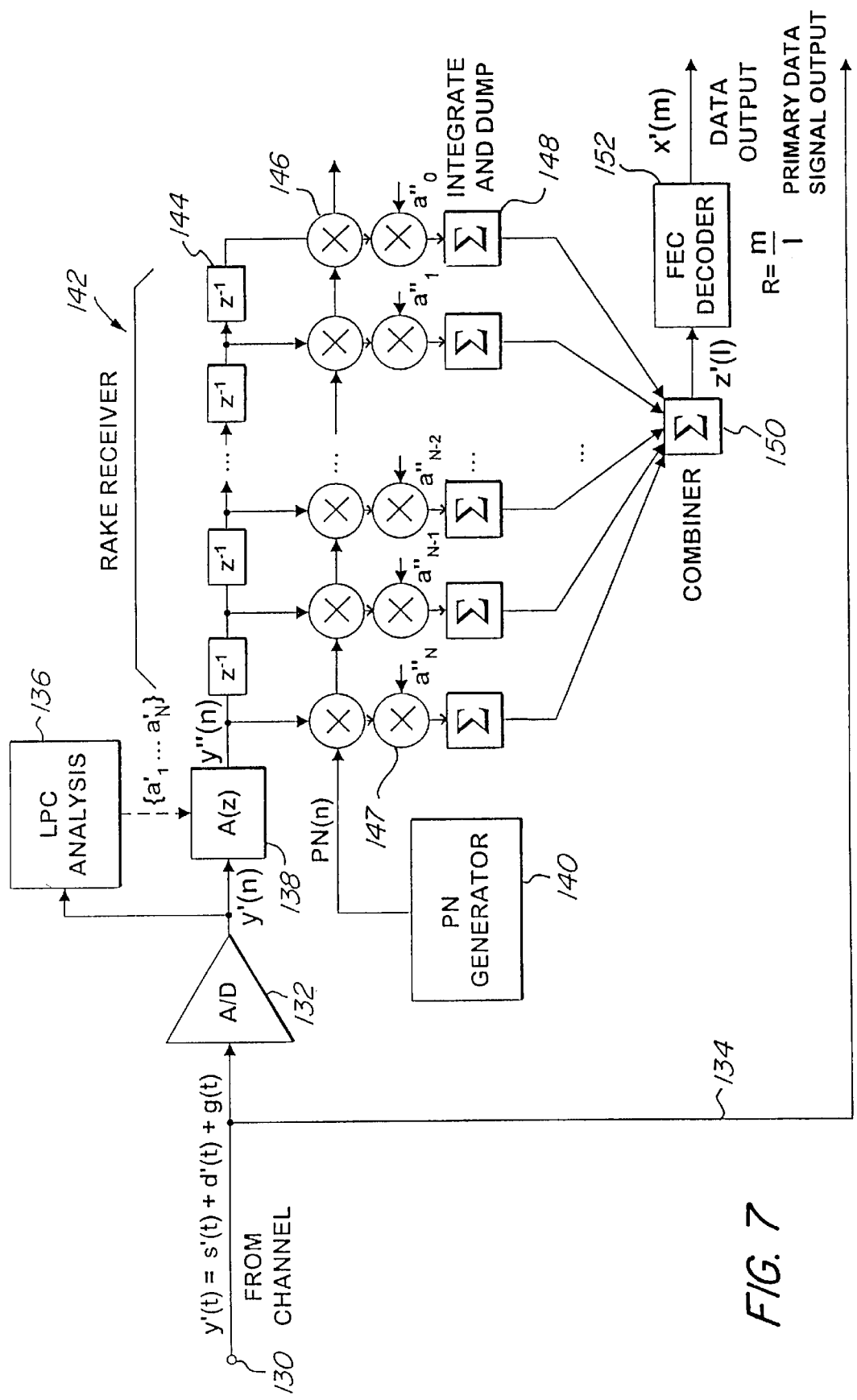
FIG. 7 is a block diagram of a hidden data transport decoder using a rake receiver.

FIG. 7 illustrates an embodiment of a decoder using a rake receiver. This decoder is useful in decoding auxiliary information from a primary audio signal produced by a white noise encoder of the type illustrated in FIG. 3. Although an uncolored white noise signal is more audible for a given power level than a colored noise signal with suitable spectral shaping, the performance of white noise signaling (e.g., as provided by the encoder of FIG. 3) can be significantly improved by a combination of an LPC filter and a rake receiver. This is achieved by using a much lower noise power than in the colored noise case, and relying on the LPC prediction gain at the receiver to reduce the interference power of the primary audio signal. However, the LPC prediction filter A(z) will shape the noise signal while whitening the spectrum of the primary audio. This intersymbol interference introduced by A(z) is overcome by a rake receiver generally designated 142 in FIG. 7, which treats each coefficient of A(z) as a multipath component.

FIG. 7 illustrates such a decoder that uses an LPC prediction filter comprising LPC analyzer 136 and LPC filter 138 together with rake receiver 142. The number of taps or "fingers" of the rake receiver must approximately match the order of the LPC filter, N. Each finger includes a multiplier 146 that receives the PN(n) sequence from PN generator 140 and a tap weight formed from a multiplier 147 that multiplies the output from the respective multiplier 146 by a respective tap weight.

The illustrated decoder utilizes a simple combining strategy that literally sums all the energy from each finger in a combiner 150. This is accomplished by setting the tap weights to 1, e.g., $a"_0=1, a"_1=1, \ldots, a"_N=1$. A more optimal combining strategy can be implemented, which dynamically changes the weights on each finger depending on the LPC coefficients. For example, $a"_0=1$, can be set to equal the LPC coefficient $a'_1$, $a"_2$ can be set to equal LPC coefficient $a'_2$, and so on, where the LPC coefficients $a'_1, a'_2, \ldots, a'_N$ are the coefficients computed locally by LPC analyzer 136.

Prior to combiner 150, the weighted outputs for each finger are integrated and dumped using circuits 148 that correspond to components 122 and 124 of FIG. 6. The output of combiner 150 is decoded in FEC decoder 152, assuming that the original auxiliary information data was FEC encoded. The audio signal received at terminal 130, which includes the auxiliary information as white noise, is output via line 134 for conventional audio processing.

Figure 8:
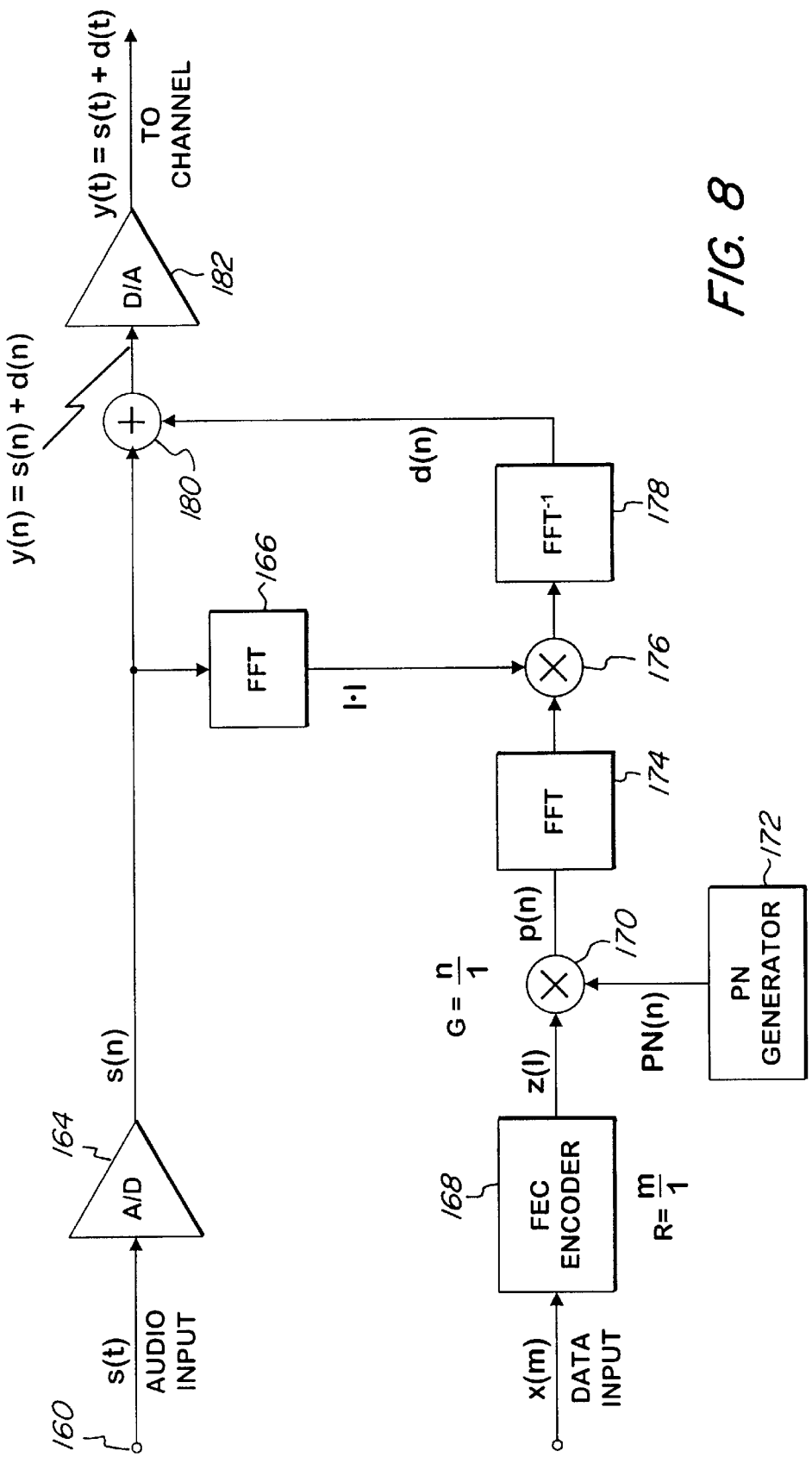
FIG. 8 is a block diagram of a hidden data transport encoder using subband coding, and particularly fast Fourier transform techniques, to spectrally shape the information to be hidden on the audio signal.

In an alternate colored noise embodiment, the spectral shaping is provided by subband coding techniques instead of linear predictive coding. As used herein, the term subband coding is meant to include transform coding. An example of an encoder using subband coding for spectral shaping is illustrated in FIG. 8. A corresponding decoder is illustrated in FIG. 9.

In the encoder of FIG. 8, the LPC filter is replaced by a fast Fourier transform (FFT) operation. Instead of the LPC analysis, an FFT of the primary audio is computed by FFT 166. This provides the spectral shape information of the primary audio, which can be used to shape the PN noise signal to match that of the primary audio. The LPC synthesis filter of FIG. 5 is replaced with an FFT 174, followed by a frequency weighting performed by multiplier 176, followed by an inverse FFT operation performed by inverse FFT processor 178. As in the embodiment of FIG. 5, the audio input is received by a D/A converter 164 via an input terminal 160, the output of which is summed in a summer 180 with the colored noise output from inverse FFT processor 178. The auxiliary information data is input to an FEC encoder 168 via terminal 162. The output of the FEC encoder is combined with a pseudorandom sequence from PN generator 172 in multiplier 170. The audio signal combined with the colored noise is converted by D/A converter 182 to an analog signal for transmission on a communication channel. As noted in connection with the embodiments described above, the FEC encoder is optional, and the A/D and D/A converters may or may not be necessary, depending on the particular form in which the audio signal is received and the form in which it is intended to be output.

Figure 9:
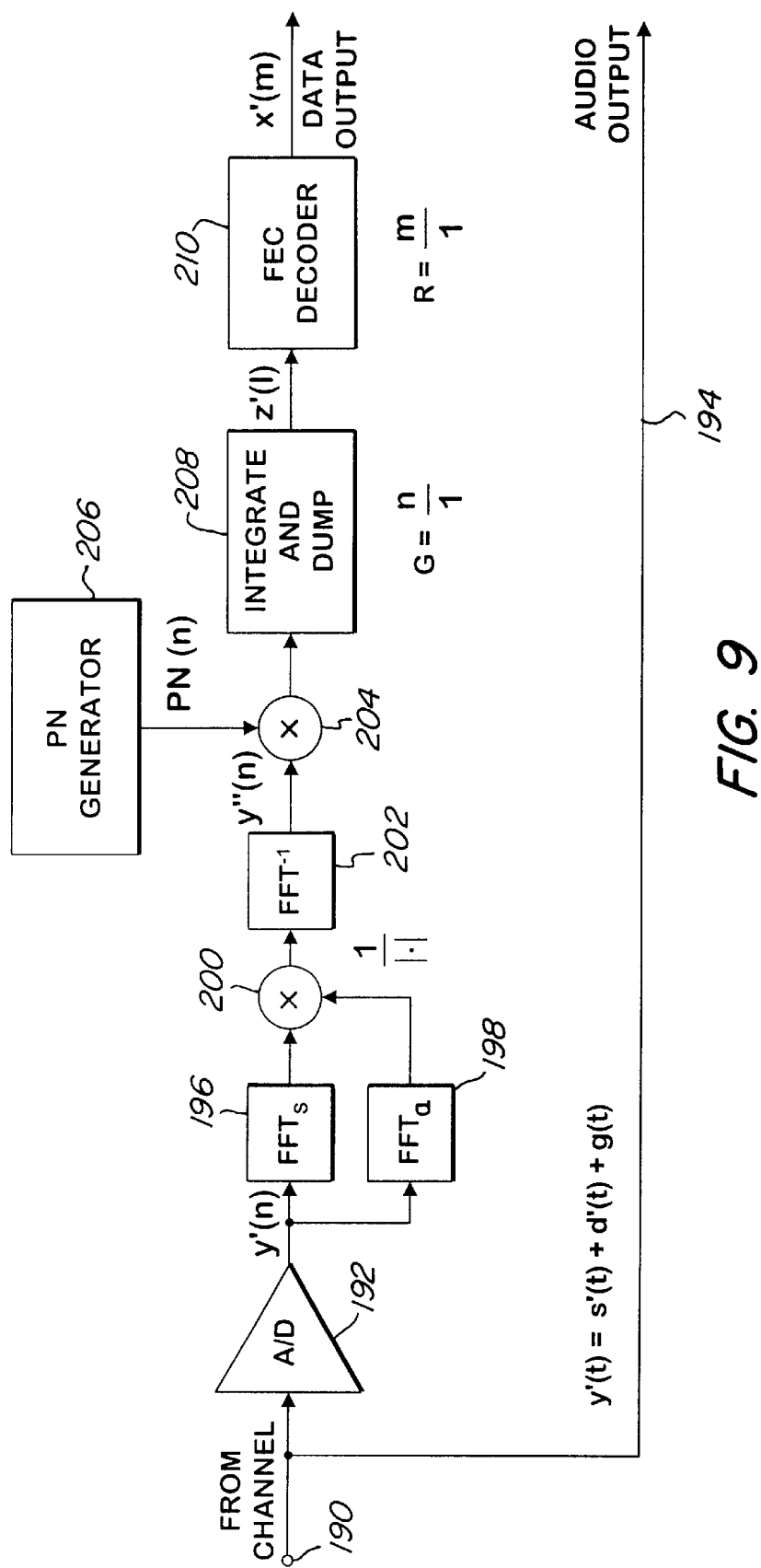
FIG. 9 is a decoder embodiment for use in recovering the information hidden using the encoder of FIG. 8.

The decoder of FIG. 9 receives the output from the encoder of FIG. 8 via terminal 190. If necessary, A/D converter 192 converts the analog input to a digital signal for processing by a shaping FFT 196 ("FFTs") and an analysis FFT 198 ("FFTa"). The outputs of these FFT's are combined by multiplier 200 for input to inverse FFT processor 202. The resultant whitened spread spectrum signal is demodulated using PN generator 206 and multiplier 204, as well as the integrate and dump circuit 208. FEC decoder 210 provides forward error correction decoding if necessary. The received signal which includes the audio signal and the auxiliary information carried thereon in the form of noise is output via line 194 to conventional audio processing circuitry.

It should be noted that the length of the analysis FFT 198 must be long enough to reliably estimate the spectrum of the primary audio signal. However, the length of the noise shaping FFT 196 does not have to be the same as the analysis FFT. If a shorter length is called for, a finite impulse response (FIR) filter can replace the noise shaping operation without much computational penalty. The FIR filter would have to be dynamically designed from the result of the analysis FFT using any well known filter design technique, such as those disclosed in Oppenheim & Schafer, *Digital Signal Accessing,* Chapter 5.6.

Figure 10:
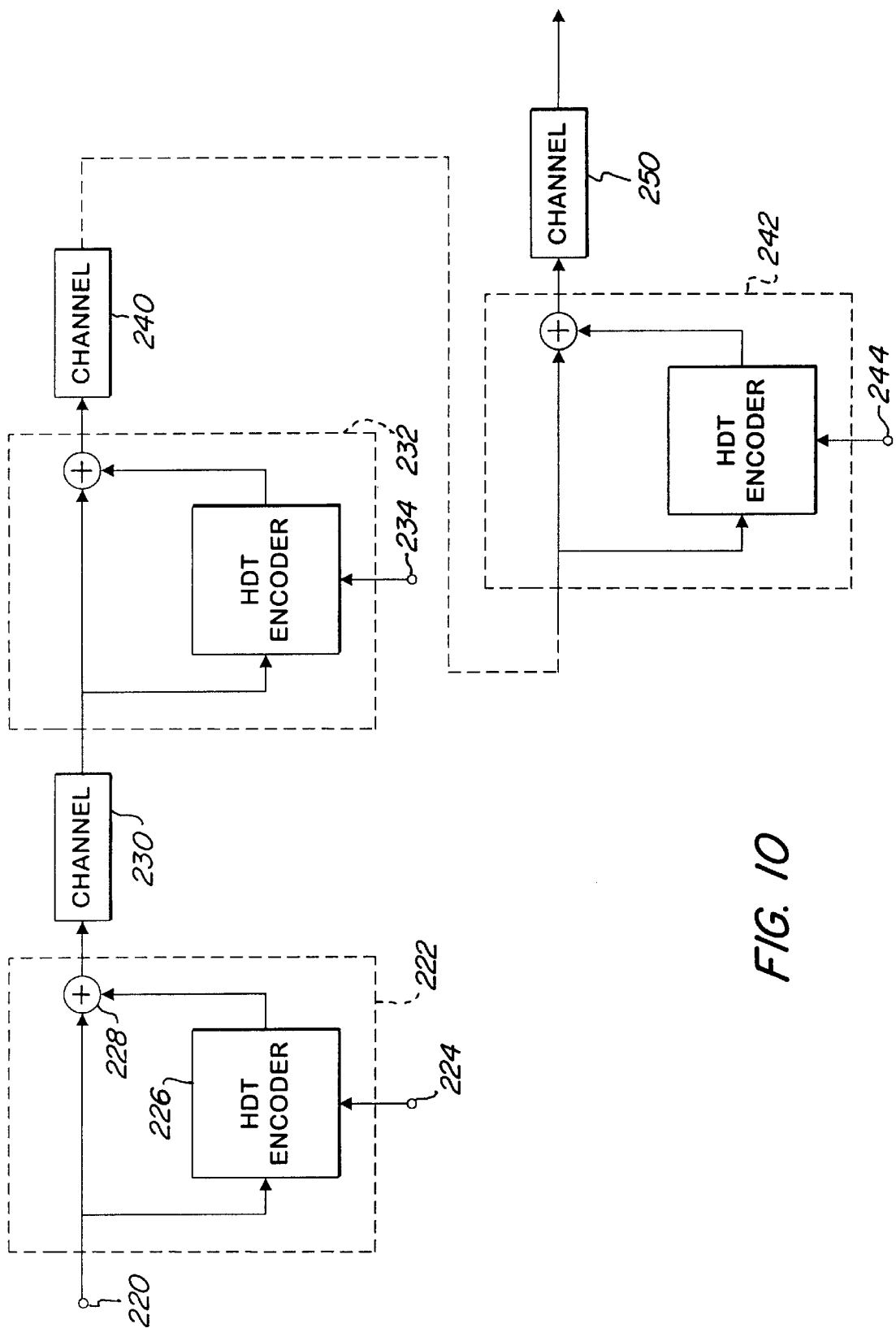
FIG. 10 is a series embodiment for hiding a plurality of auxiliary information signals on an audio signal.

The techniques of the present invention can be used to communicate a plurality of different auxiliary information signals on the same audio signal. One embodiment of an encoder for accomplishing this is illustrated in FIG. 10. In this "cascaded" embodiment, the audio signal is input via terminal 220. A first encoder 222 includes an HDT encoder 226 that adds a first auxiliary information signal input via terminal 224 to the audio signal via combiner 228. The output of encoder 222 is communicated over a channel 230 to another encoder 232. This encoder can be identical to encoder 222, and adds a second auxiliary information signal input via terminal 234 to the audio signal which already contains the first auxiliary information signal. The output of encoder 232 is communicated via channel 240 to a subsequent encoder 242, which can be identical to encoders 222 and 232. Encoder 242 receives a third auxiliary information signal via terminal 244, and adds it to the audio signal already including the first and second auxiliary information signals. The output of encoder 242 is communicated via channel 250.

Any number of auxiliary information signals can be combined using cascaded encoders as illustrated in FIG. 10. Each HDT encoder 226 can include a power control (such as component 96 illustrated in FIG. 5) to individually control the power level at which each auxiliary information signal is added to the audio signal.

Figure 11:
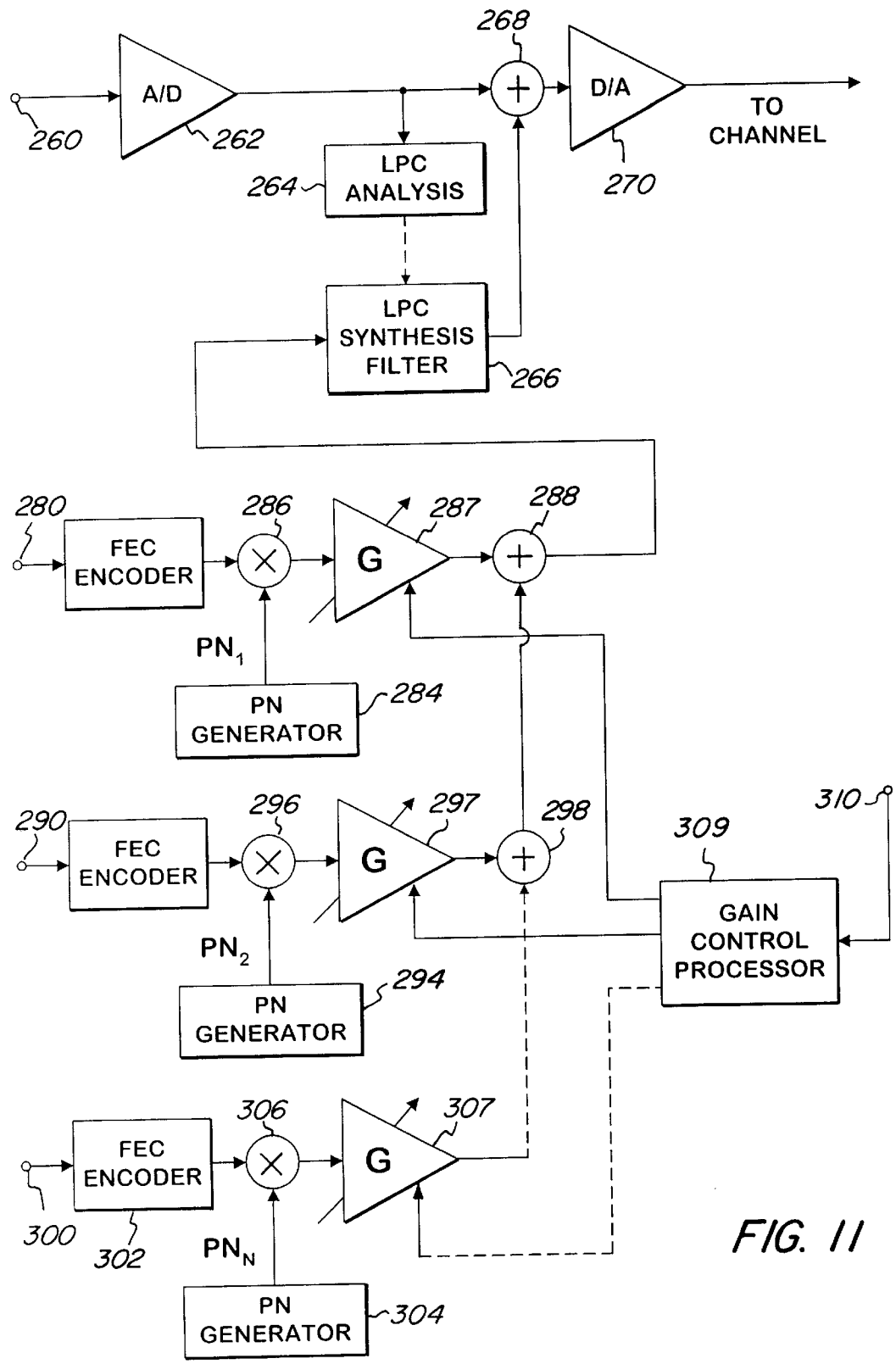
FIG. 11 is a parallel embodiment for hiding a plurality of auxiliary information signals on an audio signal.

In the example illustrated in FIG. 11, separate auxiliary information signals are processed to provide corresponding spread spectrum signals, which are combined for spectral shaping as a group. In particular, the primary audio signal is input via terminal 260 to an A/D converter 262 (which may not be used depending on the implementation) and its spectrum is analyzed by LPC analyzer 264. A first auxiliary information signal (or group of signals) is input to optional FEC encoder 282 via terminal 280. The signal input via terminal 280 can be an individual stream or a combination of individual streams, and may comprise data and/or synchronization information. It is noted that while each stream will be modulated on a spread spectrum carrier, an unmodulated carrier can also be transported, e.g., as a pilot signal. Such a pilot signal is useful for various synchronization purposes at a decoder, including acquisition and tracking, synchronizing the demodulator, PN sequence synchronization and/or FEC synchronization.

The signal input at terminal 280 is converted to a spread spectrum format using PN generator 284 and multiplier 286. A second auxiliary information signal, which may also comprise a combination of different data streams, is input to optional FEC encoder 292 via terminal 290. This signal is converted to a spread spectrum format by PN generator 294 and multiplier 296. An "Nth" auxiliary information signal (which may comprise a combination of different data streams) is input to optional FEC encoder 302 via terminal 300, and converted to a spread spectrum signal by PN generator 304 and multiplier 306. The second and Nth spread spectrum signals are combined in a combiner 298, and these are combined with the first spread spectrum signal in combiner 288.

The PN generators 284, 294 and 304 can all operate at the same or different data rates. For example, if the data input to terminals 280, 290 and 300 is provided at different rates, the PN generators may be provided at different rates as a means of distinguishing the auxiliary information signals at a decoder. If all of the PN generators operate at the same data rate, then their PN sequences will preferably all be orthogonal with respect to each other to facilitate distinguishing the different input data streams at the decoder, in accordance with well known spread spectrum demodulation techniques.

A variable gain stage can be provided after any or all of the multipliers 286, 296 and 306 for adjusting the gain of the corresponding spread spectrum signal in each path. Such gain stages 287, 297 and 307 are illustrated in FIG. 11. The gain of any path can be adjusted based on the gain(s) of any of the other paths, in order to provide the different auxiliary information signals at desired levels in the audio signal. Allocation of the total combined signal gain among the auxiliary information signals in each path is provided by a gain analyzer and control processor 309 that sets and maintains a relative signal strength among the multiple streams and can independently adjust the appropriate gain stage(s) 287, 297 and/or 307 for adjusting the gain in each path. A control input 310 is provided to enable manual or dynamic adjustment of the relative signal strength among the data streams. For example, a manual adjustment can be effected upon the installation of the apparatus. Alternatively, or in addition to a manual adjustment, dynamic control can be provided during the operation of the system.

The combined, gain adjusted spread spectrum signals output from combiner 288 are spectrally shaped in LPC synthesis filter 266 to simulate the spectral shape of the primary audio signal. The resultant colored noise output is combined with the primary audio signal in combiner 268 for D/A conversion (if necessary) in converter 270. It should be appreciated that instead of LPC analysis and filtering as illustrated in FIG. 11, any other suitable spectral shaping technique such as subband coding or bandpass filtering can be used.

A power control circuit (not shown) such as power estimate and control circuit 96 of FIG. 5 can be used in the encoder of FIG. 11 to control the power of all of the auxiliary information signals as a group at the output of LPC synthesis filter 266. Such a power control circuit will enable the combined auxiliary information signals to be added to the audio signal at a desired level, e.g., at a particular level below or above an audible threshold.

The combined signals provided by either of the encoders illustrated in FIGS. 10 and 11 can be recovered using a decoder of the type illustrated in FIG. 6. The decoder of FIG. 6 includes a selection control 128 that provides PN generator 118 with the necessary PN sequence to recover a desired one of the auxiliary information signals. For example, if it is desired to recover the auxiliary information input to terminal 290 of FIG. 11, selection control 128 of FIG. 6 will provide PN generator 118 with the information necessary to generate pseudorandom sequence $PN_2$, which is the sequence output by PN generator 294 in the encoder of FIG. 11.

Figure 12:
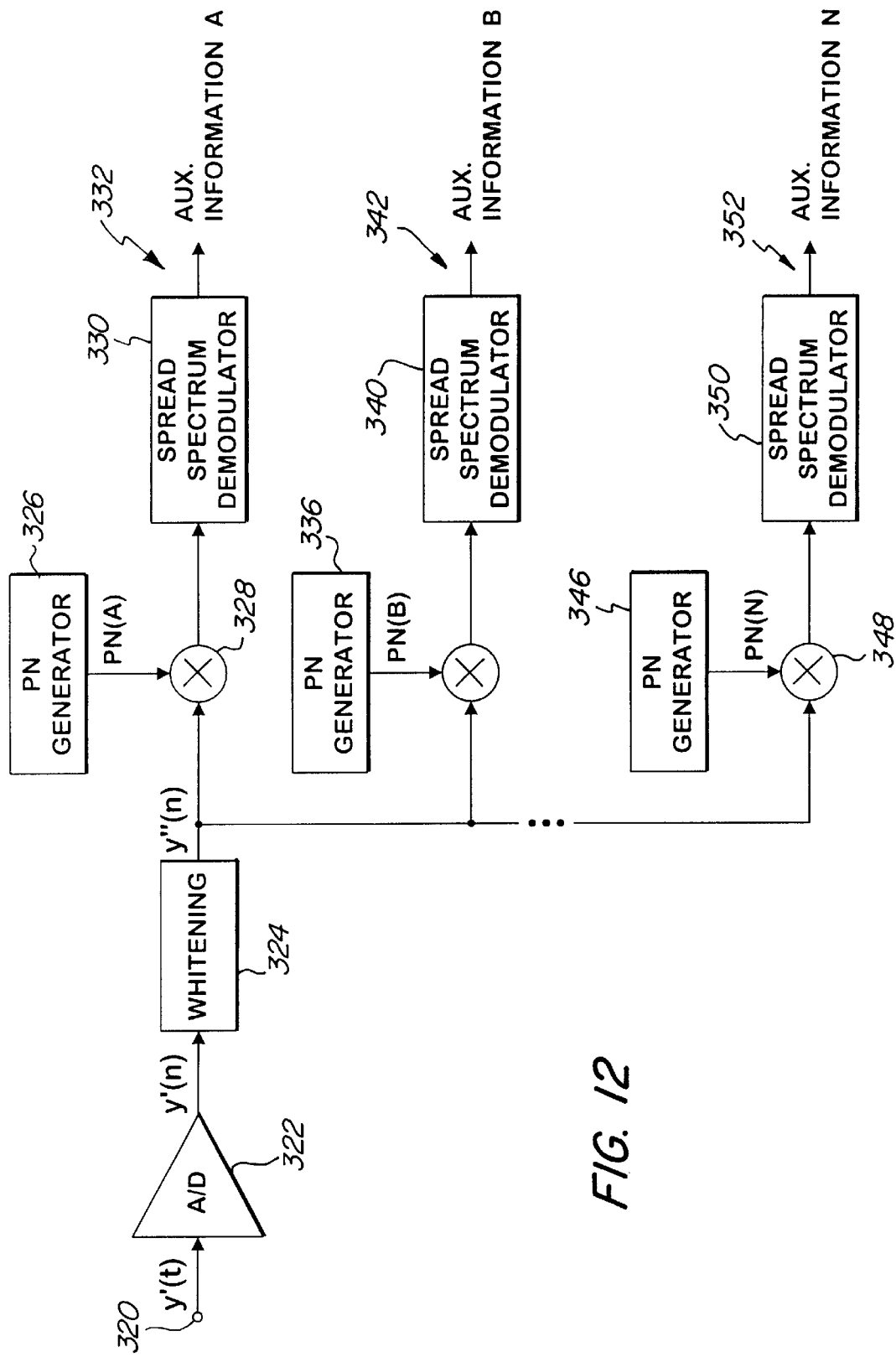
FIG. 12 is a block diagram of a decoder for simultaneously decoding a plurality of different auxiliary information signals embedded in an audio signal.

The decoder of FIG. 6 can be modified as illustrated in FIG. 12 to simultaneously decode a plurality of auxiliary information signals carried by the primary audio signal. More particularly, the decoder of FIG. 12 receives, via terminal 320, the primary audio signal having the auxiliary information signals hidden thereon as colored noise. If necessary, the input signal y'(t) is converted to the digital domain by an A/D converter 322. The resultant signal y'(n) is whitened using any available technique such as LPC analysis and prediction as shown by elements 114 and 116 in FIG. 6, by subband coding as illustrated by FFT processors 196, 198 and 202 of FIG. 9, by providing banks of bandpass filters for frequency filtering within the audio signal bandwidth, or by any other suitable spectral shaping or filtering scheme.

The decoder of FIG. 12 includes a plurality of stages 332, 342, 352, each receiving the whitened input signal y"(n). Each stage includes a PN generator (326, 336, 346) for recovering one of the plurality of auxiliary information signals. The PN generators can differentiate among the signals using any of a variety of techniques. For example, a different PN sequence can be used for each auxiliary information signal or different PN rates (e.g., 1 bps, 10 bps, 20 bps . . . etc.) could be used to differentiate the signals. If the same PN rate is used for the different auxiliary information signals, then the PN sequences used will preferably all be orthogonal with respect to each other to facilitate signal differentiation and recovery.

The PN sequence output from each PN generator is input to a respective multiplier 328, 338, 348 that also receives the whitened audio signal y"(n). The resultant output from each multiplier is input to a respective spread spectrum demodulator 330, 340 and 350 that outputs the corresponding auxiliary information signal. More particularly, stage 332 outputs auxiliary information signal "A" recovered using PN sequence PN(A), stage 342 outputs auxiliary information signal "B" using sequence PN(B), and stage 352 outputs auxiliary information signal "N" using sequence PN(N). The demodulators 330, 340 and 350 can comprise any suitable spread spectrum demodulator, such as the equivalent of "integrate and dump" components 122 and 124 shown in FIG. 6. Any required further processing of the signals output from the demodulators, such as FEC decoding, will be provided in a conventional manner.

The various other encoders and decoders illustrated in the Figures can be similarly modified to handle multiple data streams embedded on one audio signal. For example, the encoder of FIG. 3 can be provided with a plurality of stages, each comprising a separate PN generator 48, multiplier 46 and if necessary, A/D converter 50, for outputting different auxiliary information streams to combiner 52. Any required A/D conversion could alternatively be provided after the combiner. The decoder of FIG. 4 would be provided with a plurality of corresponding stages each having a PN generator 66, multiplier 64 and integrate and dump stage 68 for recovering the different auxiliary information signals carried with the primary audio signal. Any necessary gain and power control components would also be included in the various encoder stages to provide the auxiliary information signals at the desired level(s) within the primary audio signal.

It should now be appreciated that the present invention provides methods and apparatus for transporting auxiliary information in an audio signal. The auxiliary information is transported as colored noise, which is spectrally shaped to simulate the spectral shape of the primary audio signal. The spectral shaping can be provided by any number of means, including LPC filtering and subband coding techniques. PN generators can be used to provide the auxiliary information in the form of spread spectrum signals that are subsequently spectrally shaped. In order to provide for the secure transmission of the auxiliary information, the PN generators can be keyed cryptographically, so that the counterpart PN sequence cannot be generated at a decoder without the corresponding cryptographic key.

Although the invention has been disclosed in connection with various specific embodiments, it will be appreciated by those skilled in the art that numerous adaptations and modifications may be made thereto without departing from the spirit and scope of the invention as set forth in the claims.

We claim:

1. A method for transporting auxiliary information in an audio signal, comprising the steps of:

modulating a pseudorandom noise carrier by said auxiliary information to provide a spread spectrum signal carrying said information on a carrier portion thereof;

evaluating said audio signal using time domain modeling to obtain an approximation of its spectral shape; and using time domain synthesis responsive to said time domain modeling to provide a synthesis filter; and inputting said spread spectrum signal to said synthesis filter to spectrally shape the carrier portion of said spread spectrum signal to simulate the spectral shape of said audio signal, thereby producing a colored noise signal containing said auxiliary information to be carried in said audio signal.

2. A method in accordance with claim 1 comprising the further step of:

adjusting the power of said colored noise signal to provide it at a desired level in said audio signal; and combining said power adjusted colored noise signal with said audio signal to produce an output signal carrying said auxiliary information as noise in said audio signal.

3. A method in accordance with claim 1 wherein said pseudorandom noise carrier is generated cryptographically according to a cryptographic key to provide secure communication of said auxiliary information to said receiver.

4. A method for recovering said auxiliary information from a received audio signal carrying the colored noise signal of claim 1, comprising the steps of:

evaluating said received audio signal using time domain modeling to approximate its spectral shape;

using time domain prediction responsive to said time domain modeling to provide a prediction filter;

said prediction filter having a transfer function which is approximately an inverse of a transfer function of said synthesis filter;

inputting said received audio signal to said prediction filter to whiten the colored noise signal contained therein; and demodulating the whitened noise signal to recover said auxiliary information.

5. A method in accordance with claim 4 wherein:

said received audio signal comprises the sum of said colored noise signal and said audio signal.

6. A method in accordance with claim 4 wherein:

said time domain modeling comprises linear predictive coding (LPC) to provide LPC coefficients for use in said prediction filter during said spectrally shaping and whitening steps.

7. A method in accordance with claim 6 wherein:

the LPC coefficients used during said whitening step are derived from said received audio signal independently of the derivation of the LPC coefficients used during said spectrally shaping step.

8. A method in accordance with claim 1 wherein a plurality of auxiliary information signals are transported on said audio signal, said method comprising the further steps of:

modulating a plurality of pseudorandom noise carriers by said auxiliary information signals to provide a plurality of spread spectrum signals;

spectrally shaping said carriers to simulate the spectral shape of said audio signal; and combining the spectrally shaped carriers with said audio signal to produce an output signal carrying said auxiliary information signals as colored noise in said audio signal.

9. A method in accordance with claim 8 wherein each of said carriers is individually spectrally shaped prior to its combination with said audio signal.

10. A method in accordance with claim 8 wherein said carriers are combined before said spectrally shaping step, and said combined carriers are spectrally shaped as a group prior to their combination with said audio signal.

11. A method in accordance with claim 8 wherein:

at least one of said carriers is individually spectrally shaped prior to its combination with said audio signal, and at least two other of said carriers are combined before said spectrally shaping step and spectrally shaped as a group prior to their combination with said audio signal.

12. A method in accordance with claim 8 wherein:

the spectrally shaped carriers are combined with said audio signal such that at least one of said spectrally shaped carriers is combined with said audio signal after said audio signal has already been combined with at least one other of said spectrally shaped carriers.

13. A method in accordance with claim 8 comprising the further step of providing at least one of a modulated or unmodulated pseudorandom noise carrier as a pilot signal for use in synchronizing a receiver function.

14. A method in accordance with claim 8 comprising the further step of:

adjusting the gain of at least one of said spectrally shaped carriers prior to its combination with said audio signal.

15. A method in accordance with claim 14 comprising the further step of:

adjusting the power of the spectrally shaped carriers as a group to provide the group at a desired level in said audio signal.

16. A method in accordance with claim 8 comprising the further steps of:

determining the gain of at least a first one of the spectrally shaped carriers; and adjusting the gain of at least a second one of the spectrally shaped carriers in response to the gain determined for the at least one first spectrally shaped carrier.

17. A method in accordance with claim 16 comprising the further step of:

adjusting the power of at least said first and second spectrally shaped carriers as a group to provide the group at a desired level in said audio signal.

18. A method in accordance with claim 8 wherein at least two of said spectrally shaped carriers are provided at different data rates.

19. A method for recovering said auxiliary information from the output signal of claim 8 comprising the steps of:

evaluating said output signal to approximate its spectral shape;

processing the output signal, based on the approximate spectral shape determined therefor, to whiten said colored noise; and demodulating a desired spread spectrum signal after said colored noise has been whitened to recover the auxiliary information carried thereby.

20. A method in accordance with claim 19 wherein a plurality of said spread spectrum signals are demodulated simultaneously from said output signal.

21. A method for transporting a plurality of auxiliary information signals in an audio signal, comprising the steps of:

modulating each of a plurality of pseudorandom noise carriers by at least one different one of said auxiliary information signals to provide a plurality of spread spectrum signals carrying auxiliary information on carrier portions thereof;

evaluating said audio signal using subband analysis to estimate its spectral shape;

subband filtering said plurality of spread spectrum signals in response to said subband analysis for spectrally shaping the carrier portions of said spread spectrum signals to simulate the spectral shape of said audio signal; and combining the spectrally shaped carriers with said audio signal to produce an output signal carrying said auxiliary information signals as colored noise in said audio signal.

22. A method in accordance with claim 21 wherein said evaluating and subband filtering steps comprise fast Fourier transform (FFT) analysis and filtering, respectively.

23. A method in accordance with claim 21 wherein each of said carriers is individually spectrally shaped prior to its combination with said audio signal.

24. A method in accordance with claim 21 wherein said carriers are combined before said spectrally shaping step, and said combined carriers are spectrally shaped as a group prior to their combination with said audio signal.

25. A method in accordance with claim 21 wherein:

at least one of said carriers is individually spectrally shaped prior to its combination with said audio signal, and at least two other of said carriers are combined before said spectrally shaping step and spectrally shaped as a group prior to their combination with said audio signal.

26. A method in accordance with claim 21 wherein:

at least one of said spectrally shaped carriers is combined with said audio signal after said audio signal has already been combined with at least one other of said spectrally shaped carriers.

27. A method in accordance with claim 21 comprising the further step of providing at least one of a modulated or unmodulated pseudorandom noise carrier as a pilot signal for use in synchronizing a receiver function.

28. A method in accordance with claim 21 comprising the further step of:

adjusting the gain of at least one of said spectrally shaped carriers prior to its combination with said audio signal.

29. A method in accordance with claim 28 comprising the further step of:

adjusting the power of the spectrally shaped carriers as a group to provide the group at a desired level in said audio signal.

30. A method in accordance with claim 21 comprising the further steps of:

determining the gain of at least a first one of the spectrally shaped carriers; and adjusting the gain of at least a second one of the spectrally shaped carriers in response to the gain determined for the at least one first spectrally shaped carrier.

31. A method in accordance with claim 30 comprising the further step of:

adjusting the power of at least said first and second spectrally shaped carriers as a group to provide the group at a desired level in said audio signal.

32. A method in accordance with claim 21 wherein at least two of said spectrally shaped carriers are provided at different data rates.

33. A method for recovering said auxiliary information from the output signal of claim 21 comprising the steps of:

evaluating said output signal to approximate its spectral shape;

processing the output signal, based on the approximate spectral shape determined therefor, to whiten said colored noise; and demodulating a desired spread spectrum signal after said colored noise has been whitened to recover the auxiliary information carried thereby.

34. A method in accordance with claim 33 wherein a plurality of said spread spectrum signals are demodulated simultaneously from said output signal.

35. Apparatus for transporting auxiliary information in an audio signal for communication to a receiver, comprising means for converting a data stream of said auxiliary information into a spread spectrum signal carrying said information;

means for evaluating said audio signal using tine domain modeling to obtain an approximation of its spectral shape;

a time domain synthesizer responsive to said evaluating means for providing a synthesis filter; and means for inputting said spread spectrum signal to said synthesis filter for spectrally shaping a carrier portion of said spread spectrum signal to simulate the spectral shape of said audio signal, thereby producing a colored noise signal containing said auxiliary information to be carried in said audio signal.

36. Apparatus in accordance with claim 35 further comprising:

means for combining said colored noise signal with said audio signal to produce an output signal carrying said auxiliary information as noise in said audio signal.

37. Apparatus in accordance with claim 36 further comprising:

means for adjusting the power of said colored noise signal prior to said combining means to provide it at a desired level in said audio signal.

38. Apparatus in accordance with claim 35 wherein:

said evaluating means comprise a linear predictive coding (LPC) processor coupled to receive said audio signal and generate LPC coefficients therefrom; and said time domain synthesizer comprises an LPC filter responsive to said LPC coefficients.

39. Apparatus for recovering said auxiliary information from a received audio signal carrying the colored noise signal provided by the apparatus of claim 35, comprising:

means for evaluating said received audio signal using time domain modeling to approximate its spectral shape;

means for using time domain prediction responsive to said time domain modeling to provide a prediction filter;

said prediction filter having a transfer function which is approximately an inverse of a transfer function of said synthesis filter;

means for inputting said received audio signal to said prediction filter to whiten the colored noise signal contained therein; and means for demodulating the whitened noise signal to recover said data stream.

40. Apparatus in accordance with claim 39 wherein:

said means for evaluating said audio signal comprise a first linear predictive coding (LPC) processor coupled to receive said audio signal and generate first LPC coefficients therefrom;

said time domain synthesizer comprises a first LPC filter responsive to said first LPC coefficients;

said means for evaluating said received audio signal comprise a second LPC processor for generating second LPC coefficients from the received audio signal; and said time domain prediction is implemented using a second LPC filter responsive to said second LPC coefficients.

41. Apparatus in accordance with claim 40 further comprising:

means for adjusting the power of said colored noise signal to render it at a desired level in said audio signal.

42. Apparatus for transporting a plurality of auxiliary information streams in an audio signal, comprising:

means for converting said plurality of auxiliary information streams into spread spectrum signals;

means for evaluating said audio signal to obtain an approximation of its spectral shape; and means responsive to said evaluating means for spectrally shaping carrier portions of said spread spectrum signals to simulate the spectral shape of said audio signal;

wherein a combination of said spread spectrum signals is used to provide colored noise simulating the spectral shape of said audio signal for carrying said auxiliary information in said audio signal.

43. Apparatus in accordance with claim 42 further comprising:

means for adjusting the gain of at least one of said spectrally shaped carriers prior to its combination with said audio signal.

44. A method in accordance with claim 43 further comprising:

means for adjusting the power of the spectrally shaped carriers as a group to provide the group at a desired level in said audio signal.

45. Apparatus in accordance with claim 42 further comprising:

means for determining the gain of at least one first spectrally shaped carrier to be carried in said audio signal; and means for adjusting the gain of at least one second spectrally shaped carrier to be carried in said audio signal in response to the gain determined for said at least one first spectrally shaped carrier.

46. Apparatus in accordance with claim 45 further comprising:

means for adjusting the power of at least said first and second spectrally shaped carriers as a group to provide the group at a desired level in said audio signal.

47. Apparatus in accordance with claim 42 wherein:

said means for evaluating said audio signal use time domain modeling to obtain said approximation of the audio signal spectral shape; and said means responsive to said evaluating means comprise a time domain synthesizer.

48. Apparatus in accordance with claim 42 wherein:

said means for evaluating said audio signal use subband analysis to obtain said approximation of the audio signal spectral shape; and said means responsive to said evaluating means comprise at least one subband filter.

49. Apparatus in accordance with claim 48 wherein said subband analyzer and subband filter comprise a fast Fourier transform (FFT) analyzer and filter, respectively.

50. Apparatus in accordance with claim 42 further comprising:

means for adjusting the power of said colored noise to render it at a desired level in said audio signal.

51. Apparatus in accordance with claim 42 wherein:

said plurality of auxiliary information streams have different data rates; and said means for converting said auxiliary information streams into spread spectrum signals comprise pseudorandom sequence generators providing different output rates for the different information streams.

52. Apparatus in accordance with claim 42 wherein:

said means for converting said auxiliary information streams into spread spectrum signals comprise pseudorandom sequence generators providing orthogonal pseudorandom sequences for the different information streams.

53. A decoder for recovering auxiliary information carried by a spread spectrum signal that is transported as noise in an audio signal, said spread spectrum signal including a carrier that is colored to simulate the spectral shape of audio information contained in said audio signal, said decoder comprising:

means for evaluating said audio signal using time domain modeling to approximate its spectral shape, and time domain prediction responsive to said time domain modeling to provide a prediction filter;

means for inputting said audio signal to said prediction filter to whiten the colored spread spectrum carrier contained therein; and means for demodulating the whitened carrier to recover said auxiliary information.

54. A decoder in accordance with claim 53 wherein:

said evaluating means comprise a linear predictive coding (LPC) processor coupled to receive said audio signal and generate LPC coefficients therefrom; and said time domain prediction is implemented using an LPC filter responsive to said LPC coefficients.

55. A decoder in accordance with claim 53 wherein:

a plurality of auxiliary information signals are carried on respective carriers of said spread spectrum signal, all of said carriers being spectrally shaped to simulate the spectral shape of said audio information; and said demodulator means include means for selecting at least one desired carrier for demodulation to enable the recovery of at least one corresponding auxiliary information signal.

56. A decoder in accordance with claim 53 wherein:

a plurality of auxiliary information signals are carried on respective carriers of said spread spectrum signal, all of said carriers being spectrally shaped to simulate the spectral shape of said audio information; and said demodulator means include means for simultaneously demodulating a plurality of said carriers to enable the simultaneous recovery of said auxiliary information signals.

57. A decoder for recovering a plurality of auxiliary information streams carried by a spread spectrum signal that is transported as noise in an audio signal, said spread spectrum signal including a plurality of carriers that are colored to simulate the spectral shape of audio information contained in said audio signal, said decoder comprising:

means for evaluating said audio signal using time domain modeling to determine its approximate spectral shape;

means for using time domain prediction responsive to said time domain modeling to provide a prediction filter;

means for inputting said audio signal to said prediction filter to whiten the colored spread spectrum carriers contained therein; and means for demodulating the whitened carriers to recover said auxiliary information streams.

58. A decoder in accordance with claim 57 wherein:

said evaluating means comprise a linear predictive coding (LPC) processor coupled to receive said audio signal and generate LPC coefficients therefrom; and said time domain prediction is implemented using an LPC filter responsive to said LPC coefficients.

59. A decoder for recovering auxiliary information carried by a spread spectrum signal transported as noise in an audio signal, comprising:

means for whitening a spectrum of said audio signal, said whitening means creating intersymbol interference in said spread spectrum signal; and a rake receiver for receiving and demodulating said audio signal from said whitening means;

said rake receiver having a plurality of fingers for processing different multipaths of said spread spectrum signal when demodulating the received audio signal, thereby recovering said spread spectrum signal with reduced intersymbol interference in order to obtain said auxiliary information therefrom.

60. A decoder in accordance with claim 59 wherein said whitening means comprise:
- a linear predictive coding (LPC) processor coupled to receive said audio signal and generate LPC coefficients therefrom, and
- an LPC filter of order N for receiving said audio signal and responsive to said LPC coefficients for whitening said spectrum of said audio signal;
- said rake receiver comprising N fingers, where N is approximately equal to the order of said LPC filter.

61. A decoder in accordance with claim 59 wherein said whitening means comprise:
- a subband analyzer coupled to receive and estimate the spectrum of said audio signal; and
- a subband filter responsive to the spectrum estimated by said subband analyzer.

62. A decoder in accordance with claim 59 wherein each of said fingers has an associated weight, said rake receiver further comprising:
- means for individually adjusting the weights of said rake receiver fingers.

63. A decoder in accordance with claim 62 wherein the weights of said rake receiver fingers are dynamically adjustable.

64. A decoder in accordance with claim 63 wherein said weights are dynamically adjustable in response to coefficients generated by said whitening means.

\* \* \* \* \*